(12) United States Patent
Hsu et al.

(10) Patent No.: US 10,878,346 B2
(45) Date of Patent: Dec. 29, 2020

(54) INTELLIGENT DRIVING METHOD FOR PASSING INTERSECTIONS BASED ON SUPPORT VECTOR MACHINE AND INTELLIGENT DRIVING SYSTEM THEREOF

(71) Applicant: Automotive Research & Testing Center, Changhua County (TW)

(72) Inventors: Tsung-Ming Hsu, Changhua County (TW); Cheng-Hsien Wang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 109 days.

(21) Appl. No.: 16/200,613

(22) Filed: Nov. 26, 2018

(65) Prior Publication Data
US 2020/0125994 A1    Apr. 23, 2020

(30) Foreign Application Priority Data
Oct. 17, 2018    (TW) .............................. 107136584 A (51) Int. Cl.
*G06N 20/10*    (2019.01)
*B60W 30/18*    (2012.01)
*G05D 1/00*    (2006.01)

(52) U.S. Cl.
CPC ........ *G06N 20/10* (2019.01); *B60W 30/18009* (2013.01); *G05D 1/0088* (2013.01);
(Continued)

(58) Field of Classification Search
CPC .................................................. G06N 20/10
(Continued)

(56) References Cited

U.S. PATENT DOCUMENTS 9,983,591 B2     5/2018  Micks et al.
10,042,038 B1 *  8/2018  Lord ...................... G10L 25/51
(Continued)

FOREIGN PATENT DOCUMENTS

| CN | 105930625 A | 9/2016 |
| CN | 107272687 A | 10/2017 |
| CN | 107499262 A | 12/2017 |

OTHER PUBLICATIONS

NPL, Komlosi, Istvan, Motion Planning for Multiple Robots Using Time Scaling, Department of Control Engineering, and Information Technology, Budapest University of Technology and Economics (2011).*

(Continued)

*Primary Examiner* — Jean Paul Cass
(74) *Attorney, Agent, or Firm* — CKC & Partners Co., LLC (57) ABSTRACT

The intelligent driving method applied to a vehicle includes a support vector machine providing step in which the support vector machine is provided. The support vector machine has been trained by a training process. In the training process, a training dataset is provided to the support vector machine. The training dataset is obtained after an original dataset processed by a dimensionality reducing module and a time scaling module. The intelligent driving method includes a dataset processing step in which p features from an environment sensing unit are processed by the dimensionality reducing module and the time scaling module, and the processed dataset will be provided to the support vector machine. The intelligent driving method further includes a deciding step for providing a driving decision for the vehicle according to a classed result of the support vector machine.

13 Claims, 6 Drawing Sheets

(52) U.S. Cl.
CPC ..... *B60W 2420/42* (2013.01); *B60W 2420/52* (2013.01); *B60W 2554/00* (2020.02); *B60W 2554/801* (2020.02); *B60W 2554/804* (2020.02); *B60W 2720/10* (2013.01); *B60W 2720/106* (2013.01); *G05D 2201/0213* (2013.01)

(58) Field of Classification Search
USPC .......................................................... 701/27
See application file for complete search history.

(56) References Cited

U.S. PATENT DOCUMENTS

| | | | | |
|---|---|---|---|---|
| 10,118,696 | B1* | 11/2018 | Hoffberg | B64C 39/001 |
| 10,163,137 | B2* | 12/2018 | Hoffberg | G07F 17/323 |
| 2003/0063016 | A1* | 4/2003 | Mathias | G08G 1/08 |
| | | | | 340/907 |
| 2005/0094622 | A1* | 5/2005 | Mallila | H04J 3/0632 |
| | | | | 370/352 |
| 2005/0243846 | A1* | 11/2005 | Mallila | H04L 65/80 |
| | | | | 370/412 |
| 2006/0167784 | A1* | 7/2006 | Hoffberg | G06Q 20/401 |
| | | | | 705/37 |
| 2006/0200034 | A1* | 9/2006 | Ricci | A61B 5/044 |
| | | | | 600/513 |
| 2007/0063875 | A1* | 3/2007 | Hoffberg | G01C 21/28 |
| | | | | 340/995.1 |
| 2008/0159478 | A1* | 7/2008 | Keall | A61N 5/1042 |
| | | | | 378/65 |
| 2008/0167821 | A1* | 7/2008 | Breed | G08G 1/161 |
| | | | | 701/301 |
| 2008/0285599 | A1* | 11/2008 | Johansson | H04J 3/0632 |
| | | | | 370/516 |
| 2009/0089029 | A1* | 4/2009 | Sturrock | G05B 17/02 |
| | | | | 703/7 |
| 2009/0089030 | A1* | 4/2009 | Sturrock | G05B 17/02 |
| | | | | 703/7 |
| 2010/0317420 | A1* | 12/2010 | Hoffberg | G07F 17/323 |
| | | | | 463/1 |
| 2011/0118981 | A1* | 5/2011 | Chamlou | G08G 5/045 |
| | | | | 701/301 |
| 2013/0256285 | A1* | 10/2013 | Baxter | G01S 7/481 |
| | | | | 219/121.72 |
| 2018/0045522 | A1* | 2/2018 | Aziz | G08G 5/0047 |
| 2018/0242115 | A1* | 8/2018 | Kim | H04W 4/40 |
| 2019/0050453 | A1* | 2/2019 | Duffield | G06F 16/245 |
| 2019/0110175 | A1* | 4/2019 | Chun | H04W 80/08 |
| 2019/0236386 | A1* | 8/2019 | Yu | B60W 50/14 |

OTHER PUBLICATIONS

Mahmoud K. Okasha, "Using Support Vector Machines in Financial Time Series Forecasting", International Journal of Statistics and Applications, published in 2014, vol. 4, No. 1, pp. 28-39, published by Scientific & Academic, US.

* cited by examiner

INTELLIGENT DRIVING METHOD FOR PASSING INTERSECTIONS BASED ON SUPPORT VECTOR MACHINE AND INTELLIGENT DRIVING SYSTEM THEREOF

RELATED APPLICATIONS

This application claims priority to Taiwan Application Serial Number 107136584, filed Oct. 17, 2018, which is herein incorporated by reference.

BACKGROUND

Technical Field

The present disclosure relates to an intelligent driving method for passing intersections and an intelligent system thereof. More particularly, the present disclosure relates to an intelligent driving method for passing intersections based on a support vector machine and an intelligent system thereof.

Description of Related Art

Generally, many vehicles take turns or come toward each other at intersections and road junctions. A driver has to decide when to accelerate, decelerate or remain a constant speed while passing the intersections. Once the judgement of the driver is wrong, traffic accidents happen. According to the statistics in the United States, 40% traffic accidents happened at intersections or road junctions in 2008. According to the Federal Statistical Office of Germany, 47.5% traffic accidents happened at intersections or road junctions in 2013. Moreover, in some countries, more than 98% traffic accidents happened at intersections or road junctions.

In order to assist the driver's judgement for passing intersections, some practitioners developed highly automated vehicles with Artificial Intelligence (AI) paradigms, and a support vector machine is one of the machine learning algorithms. Through conducting models for prediction or estimation, the driving decisions, such as acceleration, deceleration or remaining a constant speed while passing intersections, can be provided.

In a real situation, the driver gives a driving decision based on the past information of the environment. In other words, the real driving decision has time relation. However, in the conventional training process of the support vector machine, although the dataset for training is observed and indexed in time order, the observed datasets at each sample point are considered independent, and the time series issue is not considered, which results in insufficient accuracy of the driving decision.

Based on the above-mentioned problem, how to efficiently improve the accuracy of the driving decision becomes a pursuit target for practitioners.

SUMMARY

The present disclosure provides an intelligent driving method for passing intersections based on a support vector machine. The intelligent driving method is applied to a vehicle and includes a support vector machine providing step for providing the support vector machine. The support vector machine is trained by a training process. In the training process, a training dataset is provided to the support vector machine. The training dataset is formed by processing an original dataset via a dimensionality reducing module and a time scaling module. The original dataset includes a plurality of training samples. Each of the training samples includes a passing time for passing through an intersection, and p features and a decision of each of a plurality of sample points within the passing time. The p features are processed by the dimensionality reducing module to convert into k new features, where p and k are integers and p>k. The time scaling module provides a predicted time. The new features of one of the sample points and other new features of other sample points previous to the one of the sample points are deemed as a to-be-scaled sequence. The to-be-scaled sequence is converted by the time scaling module to form a scaled sequence, and a length of the scaled sequence is equal to a number of the sample points within the predicted time. The intelligent driving method includes a dataset processing step. The p features obtained by an environment sensing unit disposed at the vehicle are processed by the dimensionality reducing module and the time scaling module, and then are provided to the support vector machine for classification. The intelligent driving method further includes a deciding step for providing a driving decision to the vehicle based on a classed result of the support vector machine.

The present disclosure provides another intelligent driving method for passing intersections based on a support vector machine. The intelligent driving method is applied to a vehicle and includes a support vector machine providing step for providing the support vector machine. The support vector machine is trained by a training process. In the training process, a training dataset is provided to the support vector machine. The training dataset is formed by processing an original dataset via a dimensionality reducing module and a time scaling module. The original dataset includes a plurality of training samples. Each of the training samples includes a passing time for passing through an intersection, and p features and a decision of each of a plurality of sample points within the passing time. The p features are processed by the dimensionality reducing module to convert into k new features, where p and k are integers and p>k. The time scaling module provides a predicted time. The new features of one of the sample points and other new features of other sample points previous to the one of the sample points are deemed as a to-be-scaled sequence. When a length of the to-be-scaled sequence is less than a number of the sample points within the predicted time, an estimated value is added into the to-be-scaled sequence to form a new to-be-scaled sequence. The new to-be-scaled sequence is converted by the time scaling module to form a scaled sequence, and a length of the scaled sequence is equal to the number of the sample points within the predicted time. The intelligent driving method includes a dataset processing step. The p features obtained by an environment sensing unit disposed at the vehicle are processed by the dimensionality reducing module and the time scaling module, and then are provided to the support vector machine for classification. The intelligent driving method further includes a deciding step for providing a driving decision to the vehicle based on a classed result of the support vector machine.

The present disclosure provides an intelligent driving system for passing intersections based on a support vector machine. The intelligent driving system is applied to a vehicle and includes a processing unit and an environment sensing unit. The processing unit is disposed at the vehicle and includes a dimensionality reducing module, a time scaling module and the support vector machine. The dimensionality reducing module is for converting p features of each of a plurality of sample points into k new features, where p and k are integers, and p>k. A predicted time is provided by the time scaling module. The new features of one of the sample points and other new features of other sample points previous to the one of the sample points are deemed as a to-be-scaled sequence. The to-be-scaled sequence is converted by the time scaling module to form a scaled sequence, and a length of the scaled sequence is equal to a number of the sample points within the predicted time. The support vector machine is trained by a training dataset, and the training dataset is formed by processing an original dataset via the dimensionality reducing module and the time scaling module. The original dataset includes a plurality of training samples, and each of the training samples includes a passing time for passing through an intersection, and the p features and a decision of each of the sample points within the passing time. The environment sensing unit is disposed at the vehicle and is signally connected to the processing unit. The p features obtained by the environment sensing unit are processed by the dimensionality reducing module and the time scaling module and then are provided to the support vector machine for classification, and a driving decision is provided to the vehicle based on a classed result of the support vector machine.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
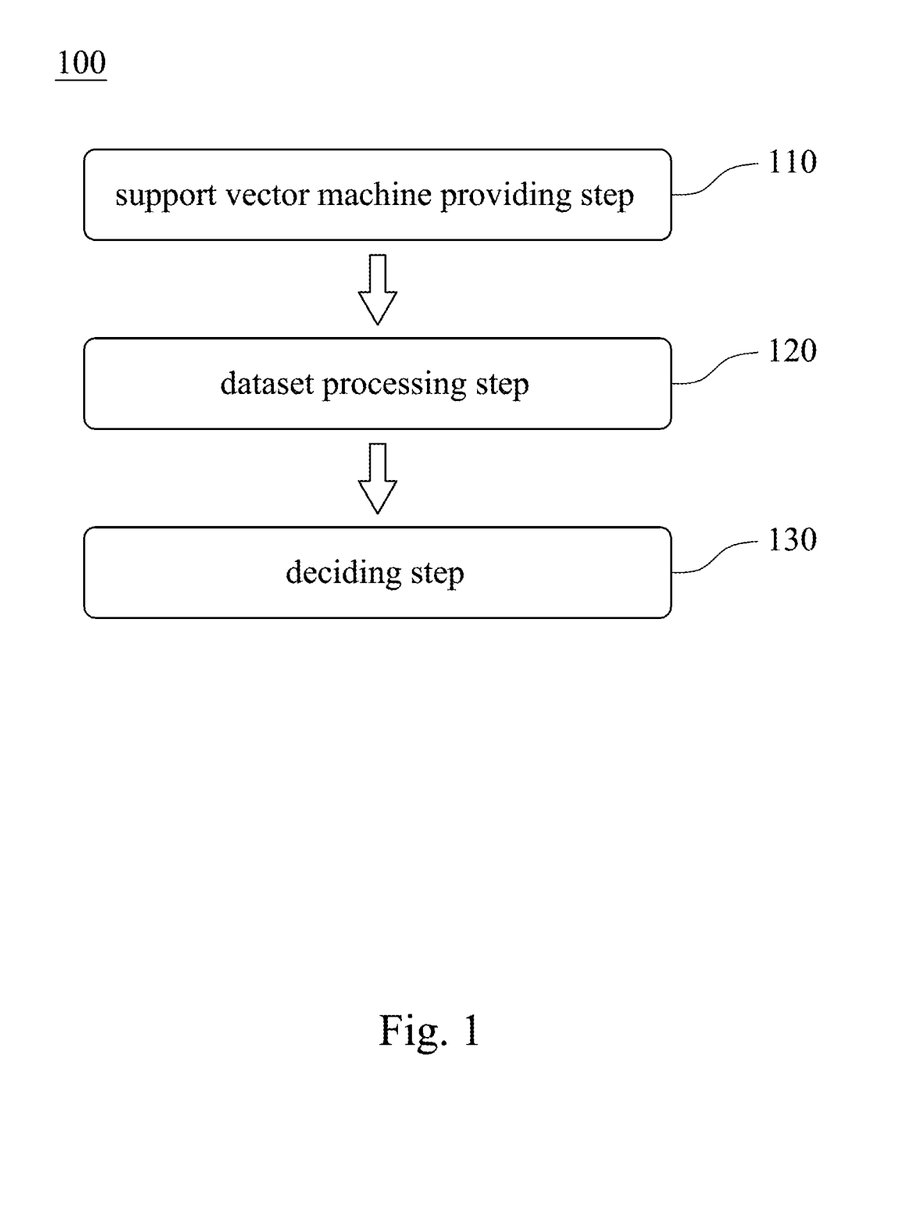
FIG. 1 is a flow chart of an intelligent driving method for passing intersections based on a support vector machine according to a first embodiment of the present disclosure.

Please refer to FIG. 1. FIG. 1 is a flow chart of an intelligent driving method 100 for passing intersections based on a support vector machine according to a first embodiment of the present disclosure. The intelligent driving method 100 is applied to a vehicle and includes a support vector machine providing step 110, a dataset processing step 120 and a deciding step 130.

In the support vector machine providing step 110, the support vector machine is provided. The support vector machine is trained by a training process. In the training process, a training dataset is provided to the support vector machine. The training dataset is formed by processing an original dataset via a dimensionality reducing module and a time scaling module. The original dataset includes a plurality of training samples. Each of the training samples includes a passing time for passing through an intersection, and p features and a decision of each of a plurality of sample points within the passing time. The p features are processed by the dimensionality reducing module to convert into k new features, where p and k are integers, and p>k. The time scaling module provides a predicted time. The new features of one of the sample points and other new features of other sample points previous to the one of the sample points are deemed as a to-be-scaled sequence. The to-be-scaled sequence is converted by the time scaling module to form a scaled sequence, and a length of the scaled sequence is equal to a number of the sample points within the predicted time.

In the dataset processing step 120, the p features obtained by an environment sensing unit are processed by the dimensionality reducing module and the time scaling module, and then are provided to the support vector machine for classification.

In the deciding step 130, a driving decision is provided to the vehicle based on a classed result of the support vector machine.

Therefore, the data of the training dataset is time-independent, and the data of the features obtained in driving processed by the dimensionality reducing module and the time scaling module are time-dependent, which results an improved accuracy of the predicted result. The detail of the intelligent driving method 100 will be described in the following paragraphs.

The support vector machine is a classifier of supervised learning, which can provide classed results to assist driving. In the support vector machine providing step 110, the provided support vector machine is trained by the training process, and can provide classed results for driving decisions, such as deceleration, acceleration, and remaining the constant speed, as the vehicle is passing the intersection.

In the training process, the training samples of the training dataset can be formed by simulating the situation of the vehicle passing through the intersection. In the first embodiment, the simulation platform can be PreScan for development of Advanced Driver Assistance Systems (ADAS), which is produced by Tass international and can setup information of related intersections to simulate vehicles passing through the intersections. In other embodiment, the training samples can be, but not limited to, obtained from real roads or other simulation software.

Every time the vehicle passing through the intersection, the data obtained therefrom can be deemed as one train sample. In other words, if the vehicle passes through the intersection ten times, ten training samples will be obtained. Each of the training samples includes the passing time for passing through the intersection, and the p features and the decision of each of the plurality of sample points within the passing time. For example, in a first training sample, if the passing time is equal to 2 seconds and the sampling frequency is 2.5 times per second, five sample points will be gotten within the passing time. At each sample point, p features and one decision, e.g., acceleration, deceleration or remaining a constant speed, will be collected. The p features can include a relative horizontal velocity between the vehicle and an approaching vehicle, a relative horizontal acceleration between the vehicle and the approaching vehicle, a relative vertical velocity between the vehicle and the approaching vehicle, a relative vertical acceleration between the vehicle and the approaching vehicle, a distance between the vehicle and the approaching vehicle, a distance between the vehicle and the intersection, and a velocity of the approaching vehicle.

The data of the first training sample can be shown in Table 1. In a single training sample, the p features of each of the q sample points can be deemed as an original feature array X, where $X=(x_1, \ldots, x_p)$ and $x_i=(x_{i1}, \ldots, x_{iq})^T$. Readers should understand that, when there are n training samples, there will be n original feature arrays $X_l$, and q will be rewritten as $q_l$. n and q are positive integers. l is a positive integer from 1 to n, and i is a positive integer from 1 to p. All the decisions of n training samples can be deemed as a decision array ZZ, where $ZZ=(x_1, \ldots, z_n)$. In the following paragraphs, $T_{lw}$ represents the wth sample point of the lth training sample. w is a positive integer from 1 to $q_l$. $x_{lwi}$ represents the lth feature obtained at the sample point $T_{lw}$. Consequently, in Table 1, $T_{11}$ represents the first sample point of the first training sample, which is 0.4 second in the first embodiment. $T_{12}$ represents the second sample point of the first training sample, which is 0.8 second in the first embodiment. $x_{111}$ represents the first feature of the first sample point $T_{11}$ of the first training sample. $x_{122}$ represents the second feature of the second sample point $T_{12}$ of the first training sample. $z_{13}$ represents the decision of the third sample point $T_{13}$ of the first training sample. The naming rules of other symbols in Table 1 are the same and will not be describe again.

TABLE 1

| Sample point | $X_1$ | | | | | | | $z_1$ |
|---|---|---|---|---|---|---|---|---|
| $T_{11}$ | $x_{111}$ | $x_{112}$ | $x_{113}$ | $x_{114}$ | $x_{115}$ | $x_{116}$ | $x_{117}$ | $z_{11}$ |
| $T_{12}$ | $x_{121}$ | $x_{122}$ | $x_{123}$ | $x_{124}$ | $x_{125}$ | $x_{126}$ | $x_{127}$ | $z_{12}$ |
| $T_{13}$ | $x_{131}$ | $x_{132}$ | $x_{133}$ | $x_{134}$ | $x_{135}$ | $x_{136}$ | $x_{137}$ | $z_{13}$ |
| $T_{14}$ | $x_{141}$ | $x_{142}$ | $x_{143}$ | $x_{144}$ | $x_{145}$ | $x_{146}$ | $x_{147}$ | $z_{14}$ |
| $T_{15}$ | $x_{151}$ | $x_{152}$ | $x_{153}$ | $x_{154}$ | $x_{155}$ | $x_{156}$ | $x_{157}$ | $z_{15}$ |

In a second training sample, if the passing time is equal to 2.4 seconds and the sampling frequency is 2.5 times per second, 6 sample points will be obtained. The data of the second training sample can be illustrated in Table 2.

TABLE 2

| Sample point | $X_2$ | | | | | | | $z_2$ |
|---|---|---|---|---|---|---|---|---|
| $T_{21}$ | $x_{211}$ | $x_{212}$ | $x_{213}$ | $x_{214}$ | $x_{215}$ | $x_{216}$ | $x_{217}$ | $z_{21}$ |
| $T_{22}$ | $x_{221}$ | $x_{222}$ | $x_{223}$ | $x_{224}$ | $x_{225}$ | $x_{226}$ | $x_{227}$ | $z_{22}$ |
| $T_{23}$ | $x_{231}$ | $x_{232}$ | $x_{233}$ | $x_{234}$ | $x_{235}$ | $x_{236}$ | $x_{237}$ | $z_{23}$ |
| $T_{24}$ | $x_{241}$ | $x_{242}$ | $x_{243}$ | $x_{244}$ | $x_{245}$ | $x_{246}$ | $x_{247}$ | $z_{24}$ |
| $T_{25}$ | $x_{251}$ | $x_{252}$ | $x_{253}$ | $x_{254}$ | $x_{255}$ | $x_{256}$ | $x_{257}$ | $z_{25}$ |
| $T_{26}$ | $x_{261}$ | $x_{262}$ | $x_{263}$ | $x_{264}$ | $x_{265}$ | $x_{266}$ | $x_{267}$ | $z_{26}$ |

If there are two training samples, the original dataset is consisted of the data of Table 1 and Table 2.

The original dataset can be converted into the training dataset by processing via the dimensionality reducing module and the time scaling module. A principal component analysis (PCA), a partial least squares regression (PLSR), a multidimensional scaling (MDS), a projection pursuit method, a principal component regression (PCR), a quadratic discriminant analysis (QDA), a regularized discriminant analysis (RDA) or a linear discriminant analysis (LDA) is performed in the dimensionality reducing module. Preferably, the principal component analysis is performed in the dimensionality reducing module. The equations of the principal component analysis are shown as Equation (1), Equation (2) and Equation (3).

$$Y=a^T X \qquad (1).$$

$$y_j = \sum_{i=1}^{p} a_{ji} x_i, \forall j \qquad (2).$$

$$\sum_{i=1}^{p} a_{ji} = 1, \forall j \qquad (3).$$

The above equations are expressed based on data of one sample point of one training sample, and the variable l of the training samples and the variable w of the sample points are not shown. Wherein Y represents the new feature array including k new features, that is, $Y=(y_1, \ldots, y_k)$, in which $y_j$ represents the jth new feature. When $q_l$ corresponding to each of the n training samples is taken into consideration, $Y_l=(y_{l1}, \ldots, y_{lk})$ and $Y_{lj1}, \ldots, y_{ljq_l}$, in which a represents coefficient array and $a_{ji}$ represents the coefficient corresponding to the ith feature $x_i$. In the first embodiment, the p features of each training sample convert into one new feature via the dimensionality reducing module, that is, k=1. Hence, the processed first training sample is illustrated in Table 3, and the processed second training sample is illustrated in Table 4. Wherein $y_{ljw}$ represents the processed jth feature of the sample point $T_{lw}$, and the data, after processed by the dimensionality reducing module, is represented by $(Y_1, z_1)$.

TABLE 3

| Sample point | $Y_1$ | $z_1$ |
|---|---|---|
| $T_{11}$ | $y_{111}$ | $z_{11}$ |
| $T_{12}$ | $y_{112}$ | $z_{12}$ |
| $T_{13}$ | $y_{113}$ | $z_{13}$ |
| $T_{14}$ | $y_{114}$ | $z_{14}$ |
| $T_{15}$ | $y_{115}$ | $z_{15}$ |

TABLE 4

| Sample point | $Y_2$ | $z_2$ |
|---|---|---|
| $T_{21}$ | $y_{211}$ | $z_{21}$ |
| $T_{22}$ | $y_{212}$ | $z_{22}$ |
| $T_{23}$ | $y_{213}$ | $z_{23}$ |
| $T_{24}$ | $y_{214}$ | $z_{24}$ |
| $T_{25}$ | $y_{215}$ | $z_{25}$ |
| $T_{26}$ | $y_{216}$ | $z_{26}$ |

Subsequently, the data processed by the dimensionality reducing module will be processed by the time scaling module. Because dataset input into a classifier of supervised learning should be of equal length, the cumulative data at each sample point will be of equal length.

A dynamic time warping (DWT) or a uniform scaling can be performed in the time scaling module. Preferably, the uniform scaling can be performed in the time scaling module.

When performing the uniform scaling, the predicted time can be provided by the time scaling module. The predicted time can be equal to a largest one of the passing times. Precisely, in the first embodiment, the passing time of the first training sample is equal to 2 seconds, and the passing time of the second training sample is equal to 2.4 seconds. The largest one of the passing times is 2.4 seconds such that the predicted time can be set to 2.4 seconds, and a number of the sample points within the predicted time is 6.

Before scaling, the new features of one of the sample points of one of the training samples and other new features of other sample points previous to the one of the sample points are deemed as the to-be-scaled sequence. Table 5 shows the to-be-scaled sequence. $L_{ljw}$ represents the to-be-scaled sequence, where $L_{ljw}=(y_{lj1}, \ldots, y_{ljw})$. If the p features processed by the dimensionality reducing module convert into one new feature, j of each of the symbols in Table 5 will be set to 1.

TABLE 5

| accumulated sample point | $L_{ljw}$ | | | | |
|---|---|---|---|---|---|
| 0-$T_{11}$ | $y_{1j1}$ | | | | |
| 0-$T_{12}$ | $y_{1j1}$ | $y_{1j2}$ | | | |
| 0-$T_{13}$ | $y_{1j1}$ | $y_{1j2}$ | $y_{1j3}$ | | |
| 0-$T_{14}$ | $y_{1j1}$ | $y_{1j2}$ | $y_{1j3}$ | $y_{1j4}$ | |
| 0-$T_{15}$ | $y_{1j1}$ | $y_{1j2}$ | $y_{1j3}$ | $y_{1j4}$ | $y_{1j5}$ |
| 0-$T_{21}$ | $y_{2j1}$ | | | | |
| 0-$T_{22}$ | $y_{2j1}$ | $y_{2j2}$ | | | |
| 0-$T_{23}$ | $y_{2j1}$ | $y_{2j2}$ | $y_{2j3}$ | | |
| 0-$T_{24}$ | $y_{2j1}$ | $y_{2j2}$ | $y_{2j3}$ | $y_{2j4}$ | |
| 0-$T_{25}$ | $y_{2j1}$ | $y_{2j2}$ | $y_{2j3}$ | $y_{2j4}$ | $y_{2j5}$ |

Precisely, in Table 5, the to-be-scaled sequence $L_{ljw}$ includes all the jth new features $y_{lj1}$-$y_{ljw}$ of the first to the wth sample points $T_{l1}$-$T_{lw}$ of the lth training sample. For example, the to-be-scaled sequence $L_{111}$ with w=1 and j=1 includes the first new feature $y_{111}$ of the sample point $T_{11}$ of the first training sample, and the length of the to-be-scaled sequence $L_{111}$ is equal to 1, that is, the to-be-scaled sequence $L_{111}$ is composed of one value. The to-be-scaled sequence $L_{213}$ with w=3 and j=1 includes the first new features $y_{211}$-$y_{213}$ of the sample points $T_{21}$-$T_{23}$ of the second training sample, and the length of the to-be-scaled sequence $L_{111}$ is equal to 3, that is, the to-be-scaled sequence $L_{111}$ is composed of three values. Therefore, the to-be-scaled sequence converts into a scaled sequence by scaling, and the length of the scaled sequence is equal to the number of the sample points within the predicted time. Since the number of the sample points within the predicted time is equal to 6 in the first embodiment, the length of the scaled sequence is equal to 6. Hence, after processed by the time scaling module, the length of each of the scaled sequences is equal to 6. The scaled sequences are illustrated in Table 6, in which $L^*_{ljw}$ represents the scaled sequence. If the p features processed by the dimensionality reducing module convert into one new feature, j of each of the symbols in Table 6 will be set to 1.

TABLE 6

| accumulated sample point | $L^*_{ljw}$ | | | | | |
|---|---|---|---|---|---|---|
| 0-$T_{11}$ | $L^*_{1j11}$ | $L^*_{1j12}$ | $L^*_{1j13}$ | $L^*_{1j14}$ | $L^*_{1j15}$ | $L^*_{1j16}$ |
| 0-$T_{12}$ | $L^*_{1j21}$ | $L^*_{1j22}$ | $L^*_{1j23}$ | $L^*_{1j24}$ | $L^*_{1j25}$ | $L^*_{1j26}$ |
| 0-$T_{13}$ | $L^*_{1j31}$ | $L^*_{1j32}$ | $L^*_{1j33}$ | $L^*_{1j34}$ | $L^*_{1j35}$ | $L^*_{1j36}$ |
| 0-$T_{14}$ | $L^*_{1j41}$ | $L^*_{1j42}$ | $L^*_{1j43}$ | $L^*_{1j44}$ | $L^*_{1j45}$ | $L^*_{1j46}$ |
| 0-$T_{15}$ | $L^*_{1j51}$ | $L^*_{1j52}$ | $L^*_{1j53}$ | $L^*_{1j54}$ | $L^*_{1j55}$ | $L^*_{1j56}$ |
| 0-$T_{21}$ | $L^*_{2j11}$ | $L^*_{2j12}$ | $L^*_{2j13}$ | $L^*_{2j14}$ | $L^*_{2j15}$ | $L^*_{2j16}$ |
| 0-$T_{22}$ | $L^*_{2j21}$ | $L^*_{2j22}$ | $L^*_{2j23}$ | $L^*_{2j24}$ | $L^*_{2j25}$ | $L^*_{2j26}$ |
| 0-$T_{23}$ | $L^*_{2j31}$ | $L^*_{2j32}$ | $L^*_{2j33}$ | $L^*_{2j34}$ | $L^*_{2j35}$ | $L^*_{2j36}$ |
| 0-$T_{24}$ | $L^*_{2j41}$ | $L^*_{2j42}$ | $L^*_{2j43}$ | $L^*_{2j44}$ | $L^*_{2j45}$ | $L^*_{2j46}$ |
| 0-$T_{25}$ | $L^*_{2j51}$ | $L^*_{2j52}$ | $L^*_{2j53}$ | $L^*_{2j54}$ | $L^*_{2j55}$ | $L^*_{2j56}$ |

The to-be-scaled sequence $L_{ljw}$ converts into the scaled sequence $L^*_{ljw}$, where $L^*_{ljw}=(L^*_{ljw1}, \ldots, L^*_{ljwr})$, by Equation (4) and Equation (5).

$$L^*_{ljwr}=y_{lj1}, \text{ if } \lfloor r \times w/q_s \rfloor = 0, \text{ for } r=1, \ldots, q_s \quad (4).$$

$$L^*_{ljwr}=y_{lj\lfloor r \times w/q_s \rfloor}, \text{ if } \lfloor r \times w/q_s \rfloor \neq 0 \quad (5).$$

Where $q_s$ represents the number of the sample points within the predicted time, and $q_s$ is smaller than or equal to $q_l$. The predicted time can be equal to a largest one of the passing times, that is, $q_s=\max(q_l)$. $\lfloor r \times w/q_s \rfloor$ represents the floor function, where $\lfloor r \times w/q_s \rfloor = \max(m \in Z | m \leq r \times w/q_s)$ and Z represents integers in mathematics. In other words, the result of $r \times w/q_s$ is rounded off, and only the integer is remained.

For example, when the to-be-scaled sequence $L_{113}=(y_{111}, y_{112}, y_{113})$ is scaled into $L^*_{113}=(L^*_{1131}, L^*_{1132}, L^*_{1133}, L^*_{1134}, L^*_{1135}, L^*_{1136})$, the data of the first position of the to-be-scaled sequence $L_{113}$ is put into the first position of the scaled sequence $L^*_{113}$, that is, $L^*_{1131}=y_{111}$. The data of the first position of the to-be-scaled sequence $L_{113}$ is put into the second position of the scaled sequence $L^*_{113}$, that is, $L^*_{1132}=y_{111}$, because the result of $2\times3/6$ is equal to 1. The data of the first position of the to-be-scaled sequence $L_{113}$ is put into the third position of the scaled sequence $L^*_{113}$, that is, $L^*_{1133}=y_{111}$, because the result of $3\times3/6$, which is equal to 1.5, is rounded off to 1. The data of the second position of the to-be-scaled sequence $L_{113}$ is put into the fourth position of the scaled sequence $L^*_{113}$, that is, $L^*_{1134}=y_{112}$, because the result of $4\times3/6$ is equal to 2. The data of the second position of the to-be-scaled sequence $L_{113}$ is put into the fifth position of the scaled sequence $L^*_{113}$, that is, $L^*_{1135}=y_{112}$, because the result of $5\times3/6$ which is equal to 2.5, is rounded off to 2. The data of the third position of the to-be-scaled sequence $L_{113}$ is put into the sixth position of the scaled sequence $L^*_{113}$, that is, $L^*_{1136}=y_{113}$, because the result of $6\times3/6$ is equal to 3. Please be noted that when the length of the to-be-scaled sequence is larger than the number of the sample points within the predicted time, that is, the length of the to-be-scaled sequence is larger than the length of the scaled sequence, the to-be-scaled sequence can also be scaled down to achieve the purpose of the present disclosure.

$(Y_l, z_l)$ represents the processed original dataset from the dimensionality reducing module and then is processed by the time scaling module to convert to the training dataset $(L^*_l, z_l)$, where $L^*_l=(L^*_{l1}, \ldots, L^*_{lk})$, $L^*_{lj}=(L^*_{lj1}, \ldots, L^*_{ljq_l})$, and $L^*_{ljw}=(L^*_{ljw1}, \ldots, L^*_{ljwq_s})$. The training dataset is illustrated in Table 7. It is noted that the last row in Table 7 is a row who has no need to be scaled and remains the original data, but in order to clearly show the relationship between the training dataset and the support vector machine, the last row in Table 7 is still represented by $L^*_{ljwr}$. If the p features processed by the dimensionality reducing module convert into one new feature, j of each of the symbols in Table 7 will be set to 1.

TABLE 7

| accumulated sample point | $L^*_{ljw}$ | | | | | | $z_l$ |
|---|---|---|---|---|---|---|---|
| 0-$T_{11}$ | $L^*_{1j11}$ | $L^*_{1j12}$ | $L^*_{1j13}$ | $L^*_{1j14}$ | $L^*_{1j15}$ | $L^*_{1j16}$ | $z_{11}$ |
| 0-$T_{12}$ | $L^*_{1j21}$ | $L^*_{1j22}$ | $L^*_{1j23}$ | $L^*_{1j24}$ | $L^*_{1j25}$ | $L^*_{1j26}$ | $z_{12}$ |
| 0-$T_{13}$ | $L^*_{1j31}$ | $L^*_{1j32}$ | $L^*_{1j33}$ | $L^*_{1j34}$ | $L^*_{1j35}$ | $L^*_{1j36}$ | $z_{13}$ |
| 0-$T_{14}$ | $L^*_{1j41}$ | $L^*_{1j42}$ | $L^*_{1j43}$ | $L^*_{1j44}$ | $L^*_{1j45}$ | $L^*_{1j46}$ | $z_{14}$ |
| 0-$T_{15}$ | $L^*_{1j51}$ | $L^*_{1j52}$ | $L^*_{1j53}$ | $L^*_{1j54}$ | $L^*_{1j55}$ | $L^*_{1j56}$ | $z_{15}$ |
| 0-$T_{21}$ | $L^*_{2j11}$ | $L^*_{2j12}$ | $L^*_{2j13}$ | $L^*_{2j14}$ | $L^*_{2j15}$ | $L^*_{2j16}$ | $z_{21}$ |
| 0-$T_{22}$ | $L^*_{2j21}$ | $L^*_{2j22}$ | $L^*_{2j23}$ | $L^*_{2j24}$ | $L^*_{2j25}$ | $L^*_{2j26}$ | $z_{22}$ |
| 0-$T_{23}$ | $L^*_{2j31}$ | $L^*_{2j32}$ | $L^*_{2j33}$ | $L^*_{2j34}$ | $L^*_{2j35}$ | $L^*_{2j36}$ | $z_{23}$ |
| 0-$T_{24}$ | $L^*_{2j41}$ | $L^*_{2j42}$ | $L^*_{2j43}$ | $L^*_{2j44}$ | $L^*_{2j45}$ | $L^*_{2j46}$ | $z_{24}$ |
| 0-$T_{25}$ | $L^*_{2j51}$ | $L^*_{2j52}$ | $L^*_{2j53}$ | $L^*_{2j54}$ | $L^*_{2j55}$ | $L^*_{2j56}$ | $z_{25}$ |
| 0-$T_{26}$ | $L^*_{2j61}$ | $L^*_{2j62}$ | $L^*_{2j63}$ | $L^*_{2j64}$ | $L^*_{2j65}$ | $L^*_{2j66}$ | $z_{26}$ |

The training dataset can be provided to the support vector machine such that a hyperplane can be found. Equation (6) to Equation (9) can be used in the support vector machine.

The hyperplane best separates the training dataset by minimizing Equation (6), subjecting to constraint of Equation (7). Moreover, the Lagrange multipliers are solved for the dual problem, which is expressed as Equation (8), subjecting to the constraints of $a_i > 0$ and $\Sigma_{l=1}^{n} \alpha_l z_l = 0$.

$$\min_{W,\xi} J(W, \xi) = \frac{1}{2}\|W\|^2 + C\sum_{l=1}^{n} \xi_l. \quad (6)$$

$$z_l(W^T\Phi(L_i) + b) \geq 1 - \xi_l, \xi_l \geq, l = 1, \ldots, n. \quad (7)$$

$$\max_{\alpha_d, d=1,\ldots,n} \left\{ \sum_{d=1}^{n} \alpha_d - \frac{1}{2}\sum_{d=1}^{n}\sum_{e=1}^{n} \alpha_d(z_d z_e K(L_d^*, L_e^*))\alpha_e \right\}. \quad (8)$$

$$K(L_d^*, L_e^*) = \Phi^T(L_d^*)\Phi(L_e^*). \quad (9)$$

Where C defines cost variable and is larger than zero. W defines entries parameter. W defines entries parameter. $\xi_l$ defines slack variable. b defines intercept term. $\alpha_d$ and $\alpha_e$ are Lagrange multiplier. $\Phi$ is radial bias function which extends the support vector machine to handle the non-linear separable training dataset. $L^*_l$, $L^*_d$ and $L^*_e$ represent the scaled sequence $L^*_{lfwr}$, and for clear illustration, only one variable is shown. d and e are variables.

The support vector machine can find the hyperplane to assist providing driving decisions after training by the training dataset.

In the dataset processing process 120, while the vehicle is passing the intersection, the p features are obtained by the environment sensing unit. The environment sensing unit can include detecting devices such as radars, cameras and GPS devices for detecting the p features including distances, velocities, etc. The types and numbers of the detecting device are not limited thereto. The p features of each sample points will be processed by the dimensionality reducing module and the time scaling module. Subsequently, in the deciding step 130, the processed dataset can be input into the support vector machine. Since the support vector machine is trained by the training dataset in advance and already found the hyperplane, the p features of the real time sample point can be processed and input into the support vector machine to output the classified result for the driving decisions, i.e., acceleration, deceleration, and remaining a constant speed.

Figure 2:
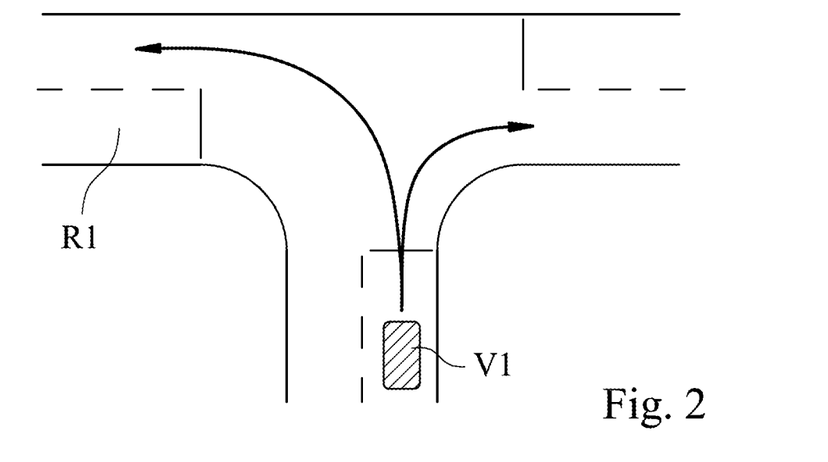
FIG. 2 is a first simulation according to the intelligent driving method for passing intersections based on the support vector machine of FIG. 1.
Figure 3:
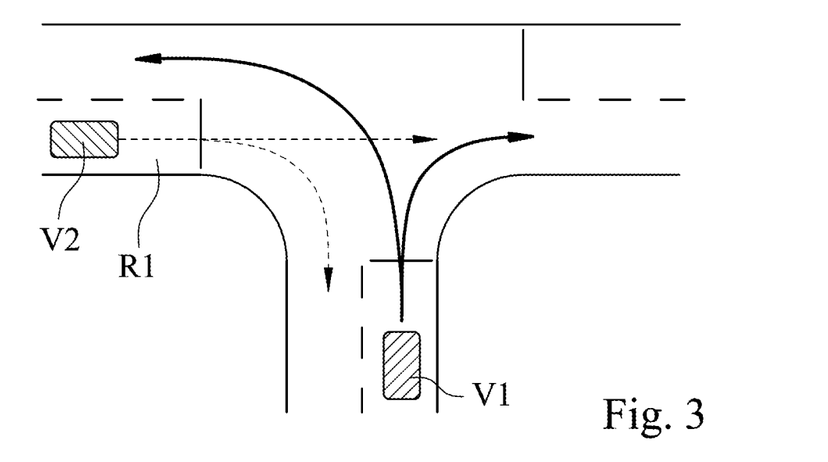
FIG. 3 is a second simulation according to the intelligent driving method for passing intersections based on the support vector machine of FIG. 1.
Figure 4:
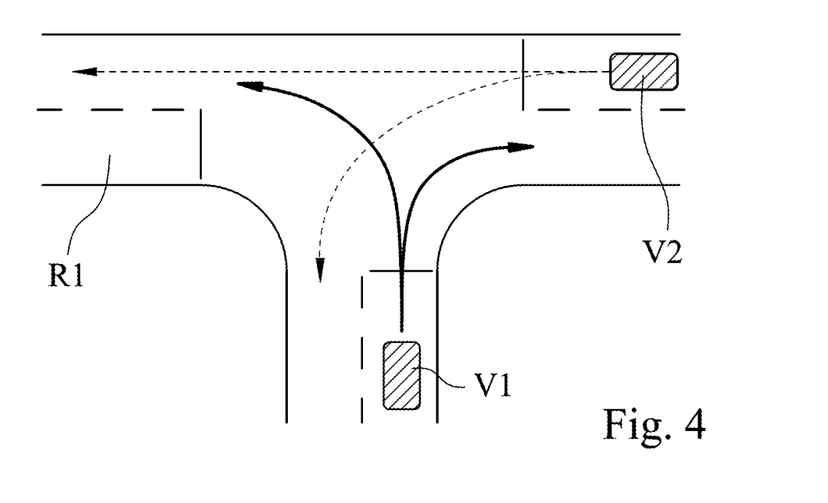
FIG. 4 is a third simulation according to the intelligent driving method for passing intersections based on the support vector machine of FIG. 1.

Please refer to FIG. 2, FIG. 3 and FIG. 4. FIG. 2 is a circumstance condition of a first simulation according to the intelligent driving method 100 for passing intersections based on the support vector machine of FIG. 1. FIG. 3 is a circumstance condition of a second simulation according to the intelligent driving method 100 for passing intersections based on the support vector machine of FIG. 1. FIG. 4 is a circumstance condition of a third simulation according to the intelligent driving method 100 for passing intersections based on the support vector machine of FIG. 1. A vehicle V1 is passing a T-intersection and is located on the vertical line in each of the first simulation, the second simulation and the third simulation. In the first simulation, no other vehicle is on the horizontal line R1. In the second simulation, an approaching vehicle V2 on the horizontal line R1 is approaching from a left hand side. In the third simulation, the approaching vehicle V2 on the horizontal line R1 is approaching from a right hand side.

The vehicle V1 has a velocity of 40 km/hr, and the approaching vehicle V2 has a velocity within 15 km/hr to 40 km/hr. The p features includes a relative horizontal velocity between the vehicle V1 and the approaching vehicle V2, a relative horizontal acceleration between the vehicle V1 and the approaching vehicle V2, a relative vertical velocity between the vehicle V1 and the approaching vehicle V2, a relative vertical acceleration between the vehicle V1 and the approaching vehicle V2, a distance between the vehicle V1 and the approaching vehicle V2, a distance between the vehicle V1 and the T-intersection, and a velocity of the approaching vehicle V2. The original data in each of the first simulation, the second simulation, and the third simulation has 20 training samples. The decision includes acceleration, deceleration and remaining a constant speed. The original dataset of each of the first simulation, the second simulation, and the third simulation will be processed by the dimensionality reducing module and the time scaling module. The predicted time of the time scaling module in the first simulation, the second simulation, and the third simulation are set to 16.9 seconds, 28.8 seconds, and 21.7 seconds, respectively.

Figure 5:
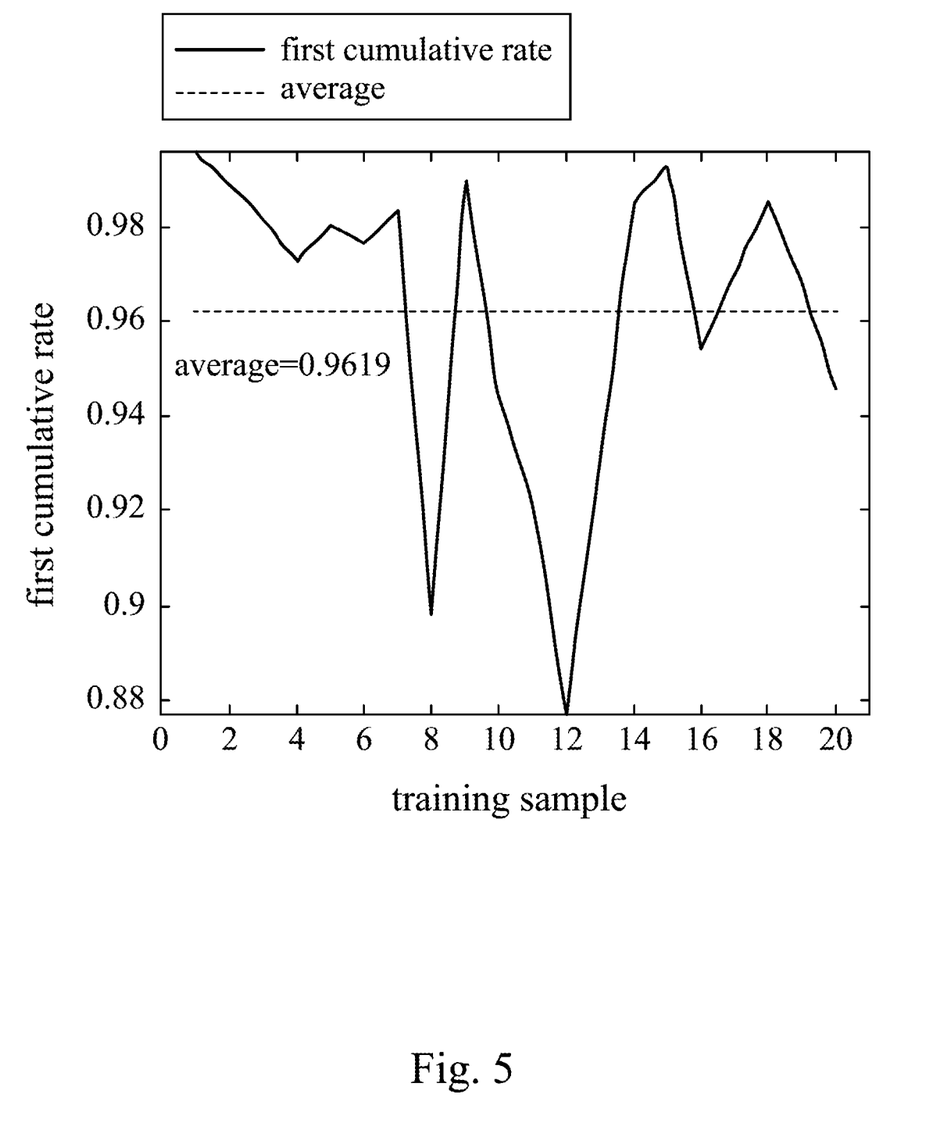
FIG. 5 is a first cumulative rate of the first simulation of FIG. 2.
Figure 6:
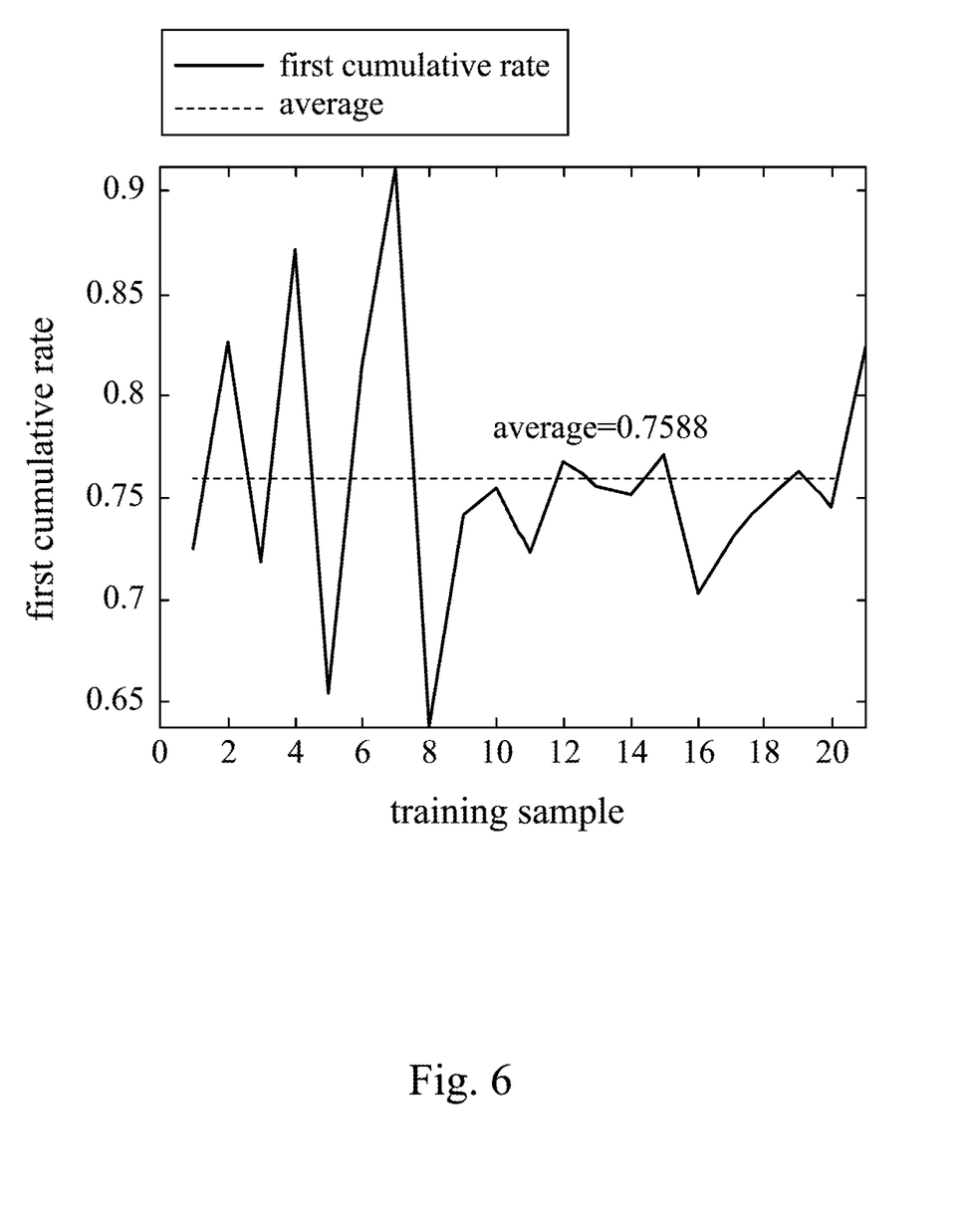
FIG. 6 is a first cumulative rate of the second simulation of FIG. 3.
Figure 7:
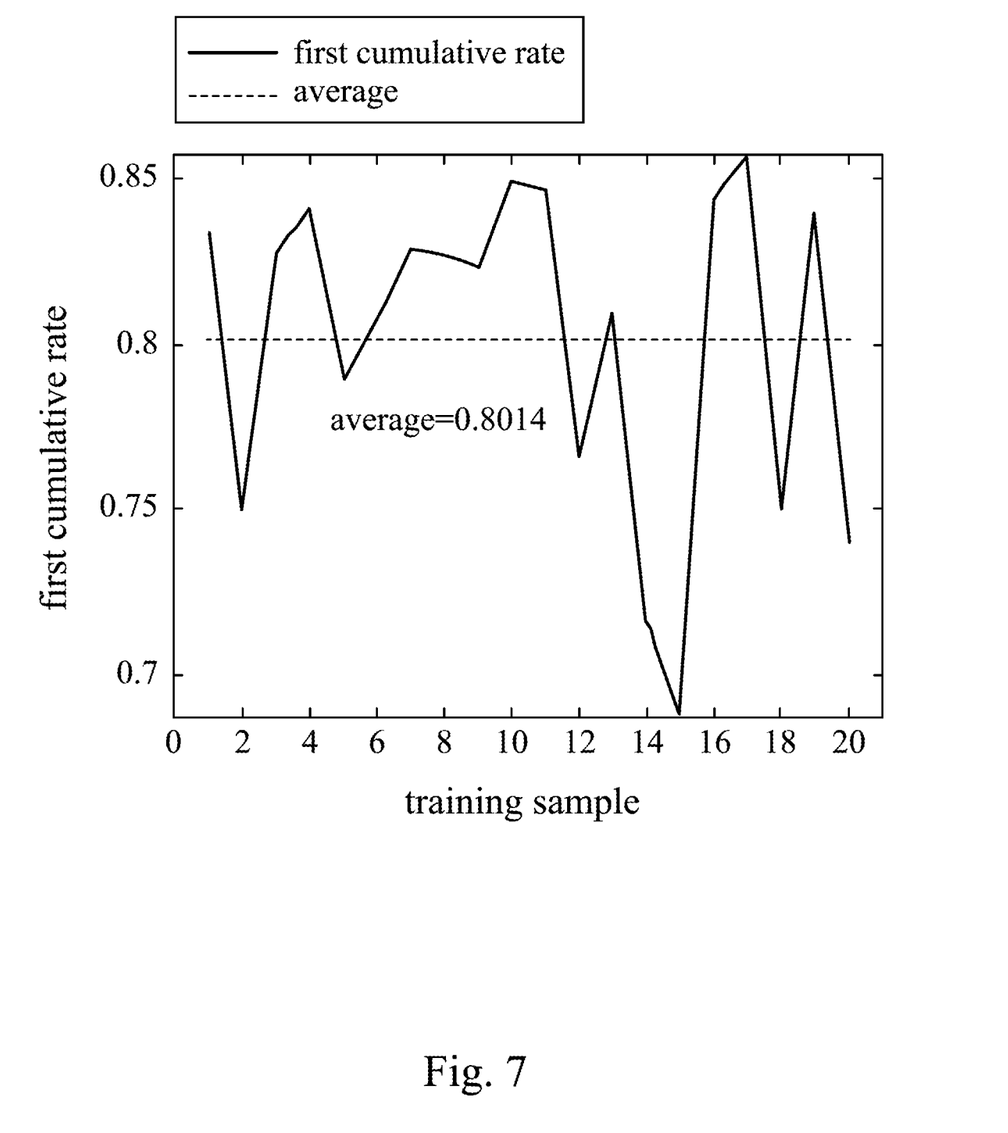
FIG. 7 is a first cumulative rate of the third simulation of FIG. 4.

Please refer to FIG. 5, FIG. 6 and FIG. 7. FIG. 5 is a first cumulative rate of the first simulation of FIG. 2. FIG. 6 is a first cumulative rate of the second simulation of FIG. 3. FIG. 7 is a first cumulative rate of the third simulation of FIG. 4. In each of the first simulation, the second simulation and the third simulation, a principal component analysis is performed in the dimensionality reducing module and only one new feature is remained, that is, only the first principal component is remained. The first cumulative rate is the percentage of variance accounted for by the first principle component. Since the averages of the first accumulative rates of the first simulation, the second simulation and the third simulation are 0.9619, 0.7588, and 0.8014, respectively, which are higher than 0.7, the original data processed by the dimensionality reducing module can be explained and satisfied the requirement.

An accuracy (AC) comparison between the first simulation and a first comparison example under the same circumstance condition with the first simulation (no other vehicle on the horizontal line R1) is illustrated in Table 8. The first comparison example also adapts the support vector machine, but the difference is that the support vector machine of the first comparison example is only trained by the original dataset. According to the comparison result, it is clear that the accuracy of the first simulation is higher than the accuracy of the first comparison example.

TABLE 8

| | predicted | | |
|---|---|---|---|
| true | acceleration | deceleration | constant speed |
| decision of the first simulation (AC = 99.03%) | | | |
| acceleration | 14 | 0 | 3 |
| deceleration | 0 | 4 | 1 |
| constant speed | 1 | 1 | 595 |
| decision of first comparison example (AC = 97.74%) | | | |
| acceleration | 7 | 0 | 10 |
| deceleration | 0 | 1 | 4 |
| constant speed | 0 | 0 | 597 |

An accuracy comparison between the second simulation and a second comparison example under the same circumstance condition with the second simulation (the approaching vehicle on the horizontal line R1 approaching from the left hand side) is illustrated in Table 9. The second comparison example also adapts the support vector machine, but the difference is that the support vector machine of the second comparison example is only trained by the original dataset. According to the comparison result, it is clear that the accuracy of the second simulation is higher than the accuracy of the second comparison example.

TABLE 9

| true | predicted | | |
|---|---|---|---|
| | acceleration | deceleration | constant speed |
| decision of the second simulation (AC = 96.21%) | | | |
| acceleration | 73 | 0 | 10 |
| deceleration | 0 | 77 | 9 |
| constant speed | 6 | 1 | 510 |
| decision of second comparison example (AC = 95.77%) | | | |
| acceleration | 60 | 0 | 17 |
| deceleration | 0 | 80 | 6 |
| constant speed | 4 | 2 | 511 |

An accuracy comparison between the third simulation and a third comparison example under the same circumstance condition with the third simulation (the approaching vehicle on the horizontal line R1 approaching from the left hand side) is illustrated in Table 10. The third comparison example also adapts the support vector machine, but the difference is that the support vector machine of the third comparison example is only trained by the original dataset. According to the comparison result, it is clear that the accuracy of the third simulation is higher than the accuracy of the third comparison example.

TABLE 10

| true | predicted | | |
|---|---|---|---|
| | acceleration | deceleration | constant speed |
| decision of the third simulation (AC = 95.85%) | | | |
| acceleration | 73 | 0 | 6 |
| deceleration | 0 | 78 | 5 |
| constant speed | 10 | 3 | 403 |
| decision of third comparison example (AC = 94.29%) | | | |
| acceleration | 61 | 0 | 18 |
| deceleration | 0 | 74 | 9 |
| constant speed | 5 | 1 | 410 |

Please be noted that all the tests are simulated by the PreScan, but the test can be conducted on a real road in other examples.

In a support vector machine providing step of a second embodiment of the present disclosure, the time scaling module provides a predicted time. The new features of one of the sample points and other new features of other sample points previous to the one of the sample points are deemed as a to-be-scaled sequence. When a length of the to-be-scaled sequence is less than a number of the sample points within the predicted time, an estimated value is added into the to-be-scaled sequence to form a new to-be-scaled sequence. The new to-be-scaled sequence is converted by the time scaling module to form a scaled sequence, and a length of the scaled sequence is equal to the number of the sample points within the predicted time.

Precisely, if the original dataset includes the data of Table 1 and Table 2 and the predicted time is set to be 2.4, the to-be-scaled sequence is illustrated in Table 5. Since the length of the to-be-scaled sequence corresponding to the accumulated sample point $0\text{-}T_{11}$, which is equal to 1, is smaller than the number of the sample points within the predicted time, which is equal to 6, and the features of the next sample point $T_{12}$ is not obtained at the accumulated sample points $0\text{-}T_{11}$, an estimated value $y'_{1j2}$ will be added to correspond to the sample point $T_{12}$. Similarly, as illustrated in Table 5, all the lengths of the to-be-scaled sequences are smaller than 6, estimated values have to be added into each to-be-scaled sequences. The new to-be-scaled sequences are illustrated in Table 11, and $y'_{ljw}$ represents the estimated value. Please be noted that the two rows corresponding to the accumulate sample points $0\text{-}T_{15}$ and the accumulate sample points $0\text{-}T_{25}$, respectively, in Table 11 are rows who have a length of 6 after adding the estimated value and have no need be scaled, but in order to clearly show the difference between the to-be-scaled sequence and the new to-be-scaled sequence, the two rows are still listed in Table 11.

TABLE 11

| accumulated sample point | $L_{1jw}$ | | | | | |
|---|---|---|---|---|---|---|
| $0\text{-}T_{11}$ | $y_{1j1}$ | $y'_{1j2}$ | | | | |
| $0\text{-}T_{12}$ | $y_{1j1}$ | $y_{1j2}$ | $y'_{1j3}$ | | | |
| $0\text{-}T_{13}$ | $y_{1j1}$ | $y_{1j2}$ | $y_{1j3}$ | $y'_{1j4}$ | | |
| $0\text{-}T_{14}$ | $y_{1j1}$ | $y_{1j2}$ | $y_{1j3}$ | $y_{1j4}$ | $y'_{1j5}$ | |
| $0\text{-}T_{15}$ | $y_{1j1}$ | $y_{1j2}$ | $y_{1j3}$ | $y_{1j4}$ | $y_{1j5}$ | $y'_{1j6}$ |
| $0\text{-}T_{21}$ | $y_{2j1}$ | $y'_{2j2}$ | | | | |
| $0\text{-}T_{22}$ | $y_{2j1}$ | $y_{2j2}$ | $y'_{2j3}$ | | | |
| $0\text{-}T_{23}$ | $y_{2j1}$ | $y_{2j2}$ | $y_{2j3}$ | $y'_{2j4}$ | | |
| $0\text{-}T_{24}$ | $y_{2j1}$ | $y_{2j2}$ | $y_{2j3}$ | $y_{2j4}$ | $y'_{2j5}$ | |
| $0\text{-}T_{25}$ | $y_{2j1}$ | $y_{2j2}$ | $y_{2j3}$ | $y_{2j4}$ | $y_{2j5}$ | $y'_{2j6}$ |

In the second embodiment, a conditional distribution of the estimated value can be obtained by using a joint distribution of the to-be-scaled sequences and a marginal distribution of the new feature $y_{ljw}$ such that the estimated value can be obtained. The new feature $y_{ljw}$ fits the marginal distribution (or the gaussian random process), that is, $y_{ljw} \sim GP(\mu_{jw}, \Sigma_{jw})$, and $(\mu_{jw}, \Sigma_{jw})$ can be estimated by Equation (10) and Equation (11). In addition, the joint distribution of the new features $y_{ljw}$ previous to the estimated value can be obtained from Equation (12), where w is larger than 2. c represents the cth training sample, and m represents the mth training sample in Equation (15).

$$\hat{\mu}_{jw} = \frac{\sum_{l=1}^{n} y_{ljw}}{n}. \tag{10}$$

$$\hat{\Sigma}_{jw} = \frac{\sum_{l=1}^{n} (y_{ljw} - \hat{\mu}_{jw})^2}{n-1}. \tag{11}$$

$$y_{ij[1:(w-1)]} \equiv (y_{lj1}, \ldots, y_{lj}(w-1)) \sim GP\left(\mu_{j[1:(w-1)]}, \Sigma_{j[1:(w-1)]}\right). \tag{12}$$

Moreover, $(\mu_{j[1:(t-1)]}, \Sigma_{j[1:(t-1)]})$ (can be estimated by Equation (13), Equation (14) and Equation (15).

$$\hat{\mu}_{j[1:(w-1)]}(\hat{\mu}_{j1}, \ldots, \hat{\mu}_{j(w-1)}). \tag{13}$$

-continued $$\hat{\Sigma}_{j[1:(w1)]} = \lceil \hat{\sigma}_{fg} \rceil_{(w1)\times(w1)}. \tag{14}$$

$$\hat{\sigma}_{fg} = \frac{\sum_{n=1}^{n}\sum_{m=1}^{n}(y_{cif}-\hat{\mu}_{jf})(y_{mjg}-\hat{\mu}_{jg})}{n-1}, f, g = 1, \ldots, w-1. \tag{15}$$

Finally, the conditional distribution of estimating the next time point based one the previous time points can be obtained, that is, estimating the sample point $T_{12}$ based on the accumulate sample points $0\text{-}T_{11}$. The conditional distributions are illustrated as Equation (16) and Equation (17).

$$\mu^*_{jt} = \mu_{jt} + \Sigma_{y_{ij}y_{ij[1:t-1]}} \Sigma_{j[1:t-1]}^{-1}(y_{ij[1:t-1]} - \mu_{j[1:t-1]}) \tag{16}$$

$$\Sigma^*_{jt} = \Sigma_{jt} - \Sigma_{y_{ij}y_{ij[1:t-1]}} \Sigma_{j[1:t-1]}^{-1} \Sigma_{y_{ij[1:t-1]}y_{ijt}} \tag{17}$$

$(\mu^*_{jt}, \Sigma^*_{jt})$ can be estimated by $(\hat{\mu}_{j[1:(t-1)]}, \hat{\Sigma}_{j[1:(t-1)]})$. After the conditional distribution is obtained, the estimated value can be estimated based on the conditional distribution (the estimated value can be set based on the Monte Carlo method).

$\Sigma_{y_{ij}y_{ij[1:w-1]}}$ represents a covariance matrix of $y_{ijw}, y_{ij[1:w-1]}$. $GP(\cdot,\cdot)$ represents gaussian random process. $\mu$ represents a mean vector of gaussian random process. $\Sigma$ represents a covariance-variance matrix of gaussian random process. $\hat{\sigma}_{fg}$ represents an estimator of an element of gaussian random process.

The accuracy of the modified first simulation including the estimated values in the support vector machine providing step are illustrated in Table 12. The accuracy of the modified second simulation including the estimated values in the support vector machine providing step are illustrated in Table 13. The accuracy of the modified third simulation including the estimated values in the support vector machine providing step are illustrated in Table 14. From the results of Table 12, Table 13 and Table 14, it is known that the accuracy is increased when including the estimated values in the support vector machine providing step.

TABLE 12 decision of the modified first simulation (AC = 99.51%)

| | predicted | | |
|---|---|---|---|
| true | acceleration | deceleration | constant speed |
| acceleration | 15 | 0 | 2 |
| deceleration | 0 | 5 | 0 |
| constant speed | 1 | 0 | 596 |

TABLE 13 decision of the modified second simulation (AC = 97.08%)

| | predicted | | |
|---|---|---|---|
| true | acceleration | deceleration | constant speed |
| acceleration | 77 | 0 | 6 |
| deceleration | 0 | 78 | 8 |
| constant speed | 5 | 1 | 511 |

TABLE 14 decision of the modified third simulation (AC = 96.88%)

| | predicted | | |
|---|---|---|---|
| true | acceleration | deceleration | constant speed |
| acceleration | 75 | 0 | 4 |
| deceleration | 0 | 80 | 3 |
| constant speed | 8 | 1 | 405 |

Figure 8:
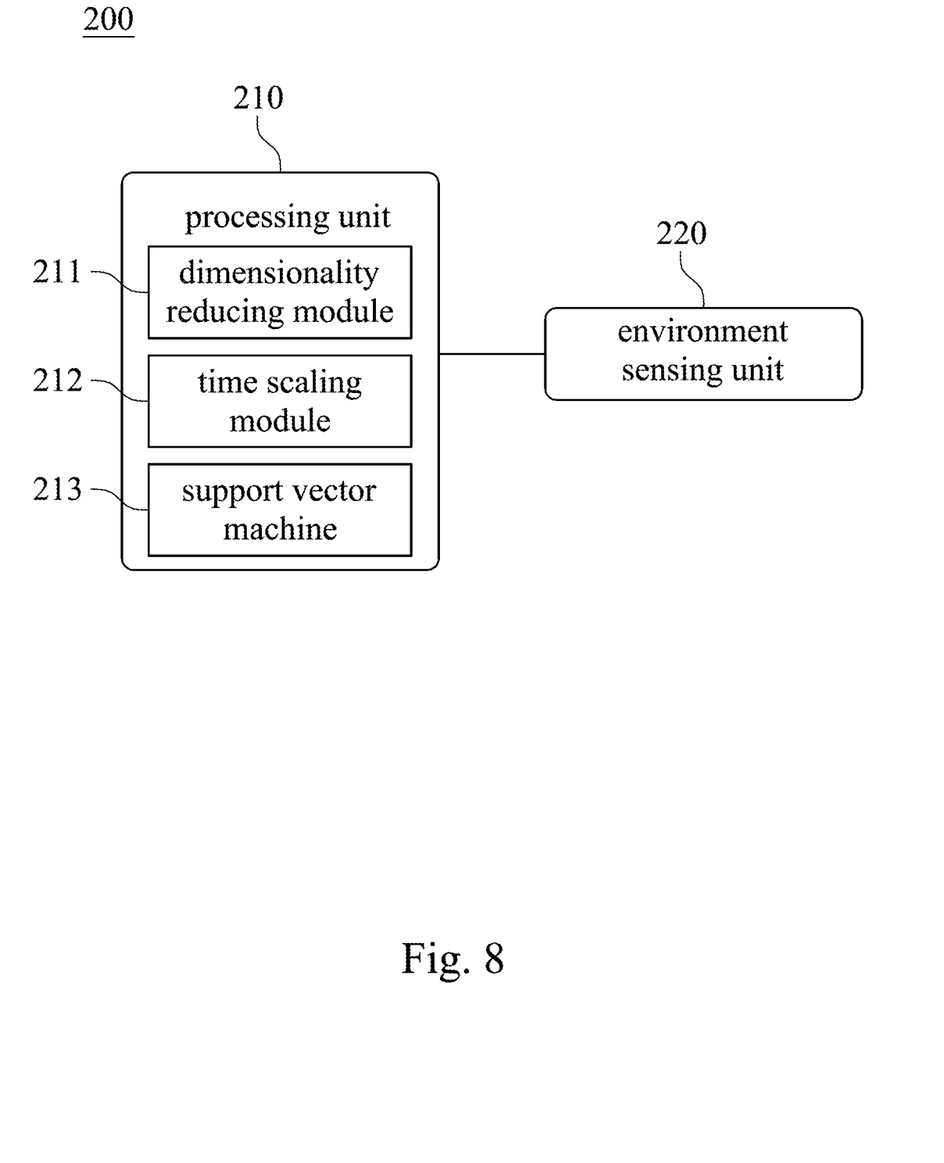
FIG. 8 is a block diagram of an intelligent driving system for passing intersections based on a support vector machine according to a third embodiment of the present disclosure.

FIG. 8 is a block diagram of an intelligent driving system 200 for passing intersections based on a support vector machine according to a third embodiment of the present disclosure. The intelligent driving system 200 is applied to a vehicle and includes a processing unit 210 and an environment sensing unit 220. The processing unit 210 is disposed at the vehicle and includes a dimensionality reducing module 211, a time scaling module 212, and the support vector machine 213. The dimensionality reducing module 211 is for integrating p features of each of a plurality of sample points into k new features, where p and k are integers, and p>k. A predicted time is provided by the time scaling module 212. The new features of one of the sample points and other new features of other sample points previous to the one of the sample points are deemed as a to-be-scaled sequence. The to-be-scaled sequence is converted by the time scaling module 212 to form a scaled sequence, and a length of the scaled sequence is equal to a number of the sample points within the predicted time. The support vector machine 213 is trained by a training dataset, and the training dataset is formed by processing an original dataset via the dimensionality reducing module 211 and the time scaling module 212. The original dataset includes a plurality of training samples. Each of the training samples includes a passing time for passing through an intersection, and the p features and a decision of each of the plurality of sample points within the passing time.

The environment sensing unit 220 is disposed at the vehicle and is signally connected to the processing unit 210. The p features obtained by the environment sensing unit 220 are processed by the dimensionality reducing module 211 and the time scaling module 212 and then are provided to the support vector machine 213 for classification, and a driving decision is provided to the vehicle based on a classed result of the support vector machine 213.

Therefore, the intelligent driving system 200 can assist the driver by giving the driving decisions such as acceleration, deceleration, and remaining a constant speed. The relationship between the dimensionality reducing module 211, the time scaling module 212, and the support vector machine 213 are as the above-mentioned description, and will not be mentioned again. The environment sensing unit 220 can include at least one of a radar, a camera and a GPS device.

The environment sensing unit can include detecting devices such as radars, cameras and GPS devices for detecting the p features including distances, velocities, etc. The types and amounts of the detecting device are no limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligent driving method for passing intersections based on a support vector machine, the intelligent driving method applied to a vehicle and comprising:
a support vector machine providing step for providing the support vector machine, wherein the support vector machine is trained by a training process, in the training process, providing a training dataset to the support vector machine, the training dataset is formed by processing an original dataset via a dimensionality reducing module and a time scaling module, the original dataset comprises a plurality of training samples, and each of the training samples comprises:
a passing time for passing through an intersection; and
p features and a decision of each of a plurality of sample points within the passing time, wherein the p features are processed by the dimensionality reducing module to convert into k new features, the time scaling module provides a predicted time, the new features of one of the sample points and other new features of other sample points previous to the one of the sample points are deemed as a to-be-scaled sequence, the to-be-scaled sequence is converted by the time scaling module to form a scaled sequence, a length of the scaled sequence is equal to a number of the sample points within the predicted time, p and k are integers, and p>k;
a dataset processing step, wherein the p features obtained in real time by an environment sensing unit are processed by the dimensionality reducing module and the time scaling module and then are provided to the support vector machine for classification, the p features obtained in real time comprise a relative horizontal velocity between the vehicle and an actual approaching vehicle at the intersection, a relative horizontal acceleration between the vehicle and the actual approaching vehicle at the intersection, a relative vertical velocity between the vehicle and the actual approaching vehicle at the intersection, a relative vertical acceleration between the vehicle and the actual approaching vehicle at the intersection, a distance between the vehicle and the actual approaching vehicle at the intersection, a distance between the vehicle and the intersection, and a velocity of the actual approaching vehicle at the intersection; and
a deciding step for providing a driving decision to the vehicle based on a classed result of the support vector machine.

2. The intelligent driving method of claim 1, wherein a principal component analysis is performed in the dimensionality reducing module.

3. The intelligent driving method of claim 1, wherein a uniform scaling is performed in the time scaling module.

4. The intelligent driving method of claim 1, wherein the predicted time is equal to a largest one of the passing times.

5. The intelligent driving method of claim 1, wherein:
each of the training samples is obtained from actual driving conditions of the vehicle on real roads including the intersection;
each of the training samples comprises data obtained when the vehicle passes through the intersection a single time; and
for said each of the training samples, the data comprises the passing time for passing through the intersection the single time, and the p features and the decision of each of the plurality of the sample points within the passing time.

6. The intelligent driving method of claim 5, wherein the decision comprises acceleration, deceleration, and remaining a constant speed of the vehicle at each of the sample points within the passing time.

7. The intelligent driving method of claim 1, wherein the p features of the original dataset are obtained by the environment sensing unit, and the environment sensing unit comprises at least one of a radar, a camera and a GPS device.

8. An intelligent driving method for passing intersections based on a support vector machine, the intelligent driving method applied to a vehicle and comprising:
a support vector machine providing step for providing the support vector machine, wherein the support vector machine is trained by a training process, in the training process, providing a training dataset to the support vector machine, the training dataset is formed by processing an original dataset via a dimensionality reducing module and a time scaling module, the original dataset comprises a plurality of training samples, and each of the training samples comprises:
a passing time for passing through an intersection; and
p features and a decision of each of a plurality of sample points within the passing time, wherein the p features are processed by the dimensionality reducing module to convert into k new features, the time scaling module provides a predicted time, the new features of one of the sample points and other new features of other sample points previous to the one of the sample points are deemed as a to-be-scaled sequence, when a length of the to-be-scaled sequence is less than a number of the sample points within the predicted time, an estimated value is added into the to-be-scaled sequence to form a new to-be-scaled sequence, the new to-be-scaled sequence is converted by the time scaling module to form a scaled sequence, a length of the scaled sequence is equal to the number of the sample points within the predicted time, p and k are integers, and p>k;
a dataset processing step, wherein the p features obtained in real time by an environment sensing unit disposed at the vehicle are processed by the dimensionality reducing module and the time scaling module and then are provided to the support vector machine for classification, the p features obtained in real time comprise a relative horizontal velocity between the vehicle and an actual approaching vehicle at the intersection, a relative horizontal acceleration between the vehicle and the actual approaching vehicle at the intersection, a relative vertical velocity between the vehicle and the actual approaching vehicle at the intersection, a relative vertical acceleration between the vehicle and the actual approaching vehicle at the intersection, a distance between the vehicle and the actual approaching vehicle at the intersection, a distance between the vehicle and the intersection, and a velocity of the actual approaching vehicle at the intersection; and a deciding step for providing a driving decision to the vehicle based on a classed result of the support vector machine.

9. The intelligent driving method of claim 8, wherein a principal component analysis is performed in the dimensionality reducing module.

10. The intelligent driving method of claim 8, wherein a uniform scaling is performed in the time scaling module.

11. An intelligent driving system for passing intersections based on a support vector machine, the intelligent driving system applied to a vehicle and comprising:
 a processing unit disposed at the vehicle and comprising:
  a dimensionality reducing module for integrating p features of each of a plurality of sample points into k new features, p and k are integers, and p>k, wherein the p features obtained in real time comprise a relative horizontal velocity between the vehicle and an actual approaching vehicle at the intersection, a relative horizontal acceleration between the vehicle and the actual approaching vehicle at the intersection, a relative vertical velocity between the vehicle and the actual approaching vehicle at the intersection, a relative vertical acceleration between the vehicle and the actual approaching vehicle at the intersection, a distance between the vehicle and the actual approaching vehicle at the intersection, a distance between the vehicle and the intersection, and a velocity of the actual approaching vehicle at the intersection;
  a time scaling module, wherein a predicted time is provided, the new features of one of the sample points and other new features of other sample points previous to the one of the sample points are deemed as a to-be-scaled sequence, the to-be-scaled sequence is converted by the time scaling module to form a scaled sequence, a length of the scaled sequence is equal to a number of the sample points within the predicted time; and
 the support vector machine trained by a training dataset, wherein the training dataset is formed by processing an original dataset via the dimensionality reducing module and the time scaling module, the original dataset comprises a plurality of training samples, each of the training samples comprises:
  a passing time for passing through an intersection; and
  p features and a decision of each of the plurality of sample points within the passing time; and
 an environment sensing unit disposed at the vehicle and signally connected to the processing unit;
 wherein the p features obtained by the environment sensing unit are processed by the dimensionality reducing module and the time scaling module and then are provided to the support vector machine for classification, and a driving decision is provided to the vehicle based on a classed result of the support vector machine.

12. The intelligent driving system of claim 11, wherein the environment sensing unit comprises at least one of a radar, a camera and a GPS device.

13. The intelligent driving system of claim 11, wherein the driving decision comprises at least one of acceleration, deceleration, and remaining a constant speed.

* * * * *